(Model.)

J. S. SACKETT & J. P. LAVIGNE.
EMBROIDERING ATTACHMENT FOR SEWING MACHINES.

No. 300,644. Patented June 17, 1884.

Witnesses. Jos. S. Sackett & Jos. P. Lavigne,
Inventors
By Atty.

N. PETERS, Photo-Lithographer, Washington, D. C.

UNITED STATES PATENT OFFICE.

JOSEPH S. SACKETT AND JOSEPH P. LAVIGNE, OF NEW HAVEN, ASSIGNORS, BY DIRECT AND MESNE ASSIGNMENTS, TO THE SACKETT MANUFACTURING COMPANY, OF WALLINGFORD, CONNECTICUT.

EMBROIDERING ATTACHMENT FOR SEWING-MACHINES.

SPECIFICATION forming part of Letters Patent No. 300,644, dated June 17, 1884.

Application filed January 28, 1884. (Model.)

*To all whom it may concern:*

Be it known that we, JOSEPH S. SACKETT and JOSEPH P. LAVIGNE, of New Haven, in the county of New Haven and State of Connecticut, have invented a new Improvement in Embroidering Attachments for Sewing-Machines; and we do hereby declare the following, when taken in connection with accompanying drawings and the letters of reference marked thereon, to be a full, clear, and exact description of the same, and which said drawings constitute part of this specification, and represent, in—

Figure 1:
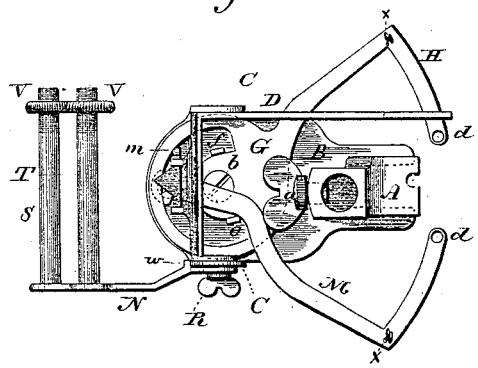
Figure 2:
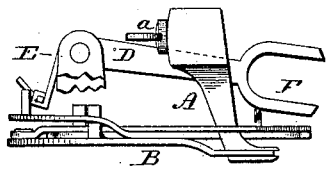
Figure 3:
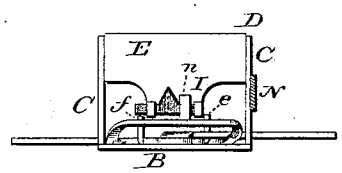
Figure 10:
Figure 4:
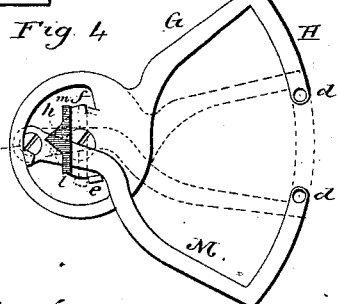
Figures 5, 6:
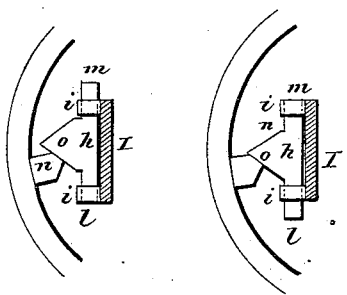
Figure 7:
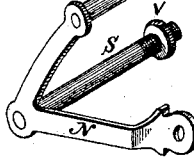
Figures 8, 9:
Figure 11:
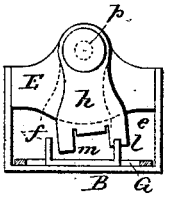
Figure 12:
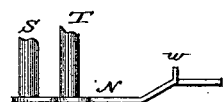

Figure 1, a top view; Fig. 2, a side view, parts broken away for convenience of illustration; Fig. 3, a rear view; Fig. 4, a partial plan view to illustrate the operation of the braid-carrying levers; Figs. 5, 6, and 7, detached views enlarged to illustrate the operation; Figs. 8 and 9, modifications; Fig. 10, a rear view of the presser-foot, showing the grooves for the introduction of the attachment when not made as a part of the presser-foot; Fig. 11, a perspective view of the spool-holding bracket detached; Fig. 12, a top view of the same.

This invention relates to an improvement in that class of attachments for sewing-machines which are applied to the presser-foot and operated through a vibrating lever, to which movement is imparted from the reciprocating needle-bar, and particularly to that class of attachments in which a pair of fingers are arranged to vibrate in a plane parallel with the work-plate, and so that in their vibration they cross the needle-line in front of the needle, each of the fingers provided with an eye to carry a cord, and whereby each cord is carried first to the right and then to the left of the needle, and commonly called "embroidery attachments," the invention relating particularly to the mechanism for imparting vibratory movement to the said fingers, or to one of them when, as in some cases, only one is employed; and the invention consists in a base-plate constructed for attachment to or made a part of the presser-foot, having a vibratory lever arranged thereon to work in a vertical plane in connection with the needle-bar, combined with a lever pivoted to the base in rear of the presser-foot, and so as to swing in a plane at right angles to the plane of the actuating-lever, (that is, parallel with the work-plate,) and, extending forward, terminates in a finger forward of the needle, and so that as the lever swings from right to left its finger will pass to the right and left of the needle-line, and a dog on said actuating-lever moved to the right or left by the descent of the actuating-lever, and so as to engage said second lever at each ascending movement of the actuating-lever, first to turn the said second lever to the right in one ascent and then to the left in the next ascent, and as more fully hereinafter described.

A represents the presser-foot, which is constructed for attachment to the presser-foot spindle by any of the various known devices, (here represented as by a set-screw, *a*.) To the presser-foot, near its lower end, the base-plate B is attached, and so as to stand in a plane parallel with the plane of the work-table, but preferably slightly above it, as shown. On the base at each side and in rear of the presser-foot is an upright, C, between which the lever D is hung, the body E of the lever extending across from one upright to the other. The lever D terminates at its forward or free end in a fork, F, by which connection is made with the needle-bar in the usual manner, so that each full reciprocation of the needle-bar imparts a corresponding full vibration to the lever D. On the base and centrally between the uprights the finger-lever G is hung upon a pivot, *b*, and so as to swing in a horizontal plane—that is, parallel with the work-plate and at right angles to the actuating-lever D. This lever G extends forward, and at its end terminates in a finger, H, which carries an eye, *d*, in its extreme end. The lever turns outward, so as to pass the presser-foot, and so that as the lever is vibrated the eye *d* will cross the path of the needle, as from the position seen in Fig. 4 to the position seen in broken lines, same figure, thus carrying the eye to the right and left of the central needle-line. On the hub of the lever G is a shoulder, *e*, at one side of the pivot, and a like shoulder, *f*, upon the opposite side, which project above the upper surface of the lever. The body E of the lever D extends downward toward the base, as seen in Figs. 2 and 3, and upon this extension, which, in fact, forms the second or shorter arm, I, of the actuating-lever, the dog $h$, which communicates the movement of the lever D to the lever G, is arranged. This dog is best arranged in bearings $i\ i$, and so as to slide to the right and left in a plane parallel with the plane of the lever G, and so that when in one position the one end, $l$, will project, as seen in Fig. 5, while the other end, $m$, will be drawn into or toward its bearing; but in the other position, as seen in Fig. 6, the end $m$ of the dog will project, and the end $l$ be drawn inward.

To move the dog from right to left and return, a stud, $n$, is arranged on the lever G in rear of the pivot and in a central position, and so that as the lever G swings from right to left it will carry the stud $n$ correspondingly to the right and left of the central line. From the dog a nose, $o$, projects rearward and in the plane of the stud $n$, and so that as the lever D descends and approaches the completion of its downward stroke (supposing the dog to stand in the position seen in Fig. 5) the nose of the dog $o$ will strike the stud $n$, as seen in Fig. 5, and in the completion of this movement the inclined side of the dog will pass onto the stud $n$, forcing the dog from the position seen in Fig. 5 to that seen in Fig. 6, leaving the end $m$ projecting, and this projecting end $m$ stands in line with the shoulder $f$ on the lever G, and as seen in Fig. 1. Now, as the lever D rises and brings the dog forward, the end $m$ strikes the shoulder $f$ and turns the lever G from the position seen in Figs. 1 and 4, solid lines, to the position seen in broken lines, Fig. 4. This turning of the lever G carries the stud $n$ to the opposite side of the center. Then, as the lever D next descends, the nose $o$ will strike upon the opposite side of the stud and throw the dog from the position seen in Fig. 6 to that seen in Fig. 5, leaving the end $l$ projecting. Then, as the lever D again rises, the end $l$ of the dog will strike the stud $e$ and return the lever G, and in the next descent the dog will be reversed, as before. Thus a single full vibration has been imparted to the lever G by two full vibrations of the lever D, and the eye $d$, which carries the cord or braid, has passed from side to side of the needle between the making of the stitches, and in the usual manner for such embroidery-fingers.

While we prefer to arrange the dog in guides so as to slide, as described, it may be hung to the body E of the lever above, as at $p$, Fig. 8, and so as to swing to the right and left on the pivot $p$ and in a plane across the plane of the lever G. The lower end of the dog is constructed with projections $l\ m$, corresponding to the ends of the dog, as first described, and so that standing in one position it will engage the shoulder $e$ on the lever G, and in the opposite direction, as seen in broken lines, same Fig. 8, it will engage the other shoulder, $f$.

From the rear face of the dog a like projection, $o$, is formed to engage the stud $n$, and as seen in Fig. 9.

When it is desired that the attachment shall carry two cords or braids, a second finger-lever, M, is arranged upon a pivot, $r$, in rear of the pivot $b$ of the lever G, as seen in Fig. 7, and connection is made between the lever M and lever G by, say, a stud, $s$, on one, and corresponding notch, $t$, on the other, working like the teeth of a gear, so that the movement of the lever G in one direction will impart a corresponding movement to the lever M in the opposite direction, and vice versa, as indicated in Fig. 4.

As a convenient means for attaching the device to the presser-foot when it is not made as a part thereof, the presser-foot may be constructed with a groove, $u$, (see Fig. 10,) upon opposite sides, and the forward end of the plate B slotted, so as to pass into said groove, as indicated in broken lines, Fig. 1.

To support the spools from which the cord or braid is drawn we construct a bracket, N, and detachably connect it to one of the uprights C, preferably by means of a thumbscrew, R, the end of the bracket being constructed with a shoulder, $w$, as seen in Fig. 12, to bear against the edge of the upright, while the face of the bracket lies upon the outside of the upright. This bracket is shown detached in Fig. 11.

From the bracket spindles S T extend horizontally one above the other, each fitted with a tension-nut, V, so that the spools may be set thereon and the proper tension applied.

From the spools the braid is led to the respective eyes in the end of the fingers through a guide, $x$, on each lever.

We claim—

1. The combination of the base B, constructed for attachment to or as a part of the presser-foot of a sewing-machine, the vertically-vibrating lever D, constructed for engagement with the needle-bar, the lever G, pivoted on a vertical stud on the base in rear of the presser-foot, and so as to vibrate in a plane at right angles to the plane of vibration of the lever D, its forward or free end provided with the eye $d$, and the dog $h$, arranged upon the shorter arm of the lever D, and so as to slide from right to left, the lever G provided with shoulders $e\ f$ on opposite sides of the pivot upon which it turns, and in front of the dog and on the rear extension of the lever G with a stud, $n$, in rear of the dog, said dog provided with a nose, $o$, whereby in one descent of the lever D the dog is thrown to one side, and in the next descent of the lever D the dog is thrown to the opposite side, and so as to alternately engage with the shoulders $f\ e$ on the lever G in the ascent of the lever D, substantially as described.

2. The combination of the base B, constructed for attachment to or made as a part of the presser-foot of a sewing-machine, the lever D, arranged on said base and constructed for engagement with the needle-bar of the sewing-machine, whereby said lever is caused to vibrate in a vertical plane, the lever G, pivoted on a vertical stud on the base in rear of the presser-foot, and so as to vibrate in a horizontal plane, the said lever G extending forward of the presser-foot and there provided with an eye, d, and the dog h, arranged on the shorter arm of said lever D, and in bearings parallel with the plane of the lever G, the said lever constructed with shoulders e f in front of the dog, and with a stud, n, in rear of the dog and on the rear extension of the lever G, and the dog provided with a nose, o, substantially as and for the purpose described.

3. The combination of the base B, constructed for attachment to or as a part of the presser-foot of a sewing-machine, the lever D, the lever G, constructed with shoulders e f, and with a stud, n, the dog h on the shorter arm of the lever D, and so as to be moved to the right and left, and the lever M, hung to the base in rear of the pivot of the lever G, and constructed to engage the said lever G, each of the said levers G M extending forward of the presser-foot and there provided with an eye, d, substantially as described.

JOSEPH S. SACKETT.
JOSEPH P. LAVIGNE.

Witnesses:
JOHN E. EARLE,
JOS. C. EARLE.